(12) United States Patent
Huang

(10) Patent No.: US 8,520,201 B2
(45) Date of Patent: Aug. 27, 2013

(54) OPTICAL SIGNAL INSPECTION DEVICE

(75) Inventor: Yen-Chang Huang, New Taipei (TW)

(73) Assignee: Hobbes & Co., Ltd., New Taipei (TW)

(*) Notice: Subject to any disclaimer, the term of this patent is extended or adjusted under 35 U.S.C. 154(b) by 223 days.

(21) Appl. No.: 13/184,961

(22) Filed: Jul. 18, 2011

(65) Prior Publication Data
US 2013/0021603 A1 Jan. 24, 2013

(51) Int. Cl.
G01N 21/01 (2006.01)

(52) U.S. Cl.
USPC .......... 356/244; 356/237.1; 356/237.6; 356/73.1; 356/218; 250/227.24; 385/89

(58) Field of Classification Search
USPC .......... 356/244, 237.2–237.6, 73.1, 218; 250/227.24; 385/89
See application file for complete search history.

(56) References Cited

U.S. PATENT DOCUMENTS

| | | | | |
|---|---|---|---|---|
| 4,291,943 A | * | 9/1981 | Binek et al. | 385/56 |
| 4,708,422 A | * | 11/1987 | Arnoux et al. | 398/14 |
| 6,094,261 A | * | 7/2000 | Contarino, Jr. | 356/73.1 |
| 8,090,260 B2 | * | 1/2012 | Gau | 398/38 |

* cited by examiner

Primary Examiner — Tarifur Chowdhury
Assistant Examiner — Isiaka Akanbi
(74) Attorney, Agent, or Firm — Li & Cai Intellectual Property (USA) Office

(57) ABSTRACT

An optical signal inspection device includes a housing, a diagnostic unit, an optical specimen holder, a light-shielding module, and a guiding unit. A receiving space is defined internally of the housing. The housing has an optical fiber holding area formed thereon. The optical specimen holder has an upper jaw member and a lower jaw member. The light shielding module has a main body and two lateral shielding members disposed thereon. Two side portions of the lower jaw member are formed matchingly to the lateral shielding members. The guiding unit is secured to the upper or lower jaw member. When the upper and lower jaw members are used to clamp the optical fiber for inspection, interference due to ambient lighting can be prevented by the light shielding module. Thus, quick and accurate inspection results can be obtained by the user.

10 Claims, 7 Drawing Sheets

OPTICAL SIGNAL INSPECTION DEVICE

BACKGROUND OF THE INVENTION

1. Field of the Invention

The instant disclosure relates to an optical signal inspection device; more particularly, to an optical signal inspection device for inspecting fiber optic cables.

2. Description of Related Art

Optical fiber is a flexible, transparent fiber made of very pure glass or plastic for light transmission. The optical fiber is usually on the order of ten thousandth meter thick in diameter, not much bigger than a human hair. The optical fiber can be clad by a plastic sheath to prevent breaking when bending the optical fiber. Comparing to electrical cables, optical fibers permit signal transmission over longer distance at higher bandwidths. The signals also travel with less loss and are immune to electromagnetic interference. Other advantages include higher data rates, no cross-talk between signals in different cables, better signal qualities, small size, lightweight, etc. By having higher bandwidths with faster data transmission rates, the optical fibers are a popular choice as a medium for telecommunication and networking. However, when installing optical fiber cables, a large number of patch cords (jumpers) are used to link the equipments, and the way of using the patch cords varies from person-to-person. Since all patch cords have similar features, making quick verification is rather difficult when installing or replacing the cords. In addition, the optical fiber cables are more fragile than traditional cables. Namely, the transparent core of the optical fiber is made of glass material with small diameter. Therefore, the fiber cables must be handled with care so they do not fracture or break. Also, during installing, maintenance, or troubleshooting the fiber work system, often times the identification of the bad fiber cable is not easy. Furthermore, the conventional optical signal detection device tends to have excessive light leakage and damage the fiber cable. Consequently, the diagnosis results are less reliable, the signal quality is compromised, and along with more time and labor spent to change out the bad fiber cable.

To address the above issues, the inventor strives via industrial experience and academic research to present the instant disclosure, which can effectively improve the limitations described above.

SUMMARY OF THE INVENTION

The instant disclosure is to provide an optical signal inspection device, which can quickly test the optical signals and identify its direction of propagation. In addition, light leakage is diminished to provide accurate readings, thus saving inspection and maintenance time.

The optical signal inspection device comprises a housing, a diagnostic unit, an optical specimen holder, a light-shielding module, and a guiding unit. A receiving space is formed inside the housing, along with an optical fiber holding area. The diagnostic unit, the optical specimen holder, and the light-shielding module are accommodated by the receiving space. The diagnostic unit includes a plurality of light-emitting diodes (LEDs). The optical specimen holder is disposed in corresponding to the optical fiber holding area, and has an upper jaw member and a lower jaw member. The upper and lower jaw members are used for clamping the optical fiber cable therebetween. The upper jaw member has a wave-shaped protrusion, and the lower jaw member has a complementary concaved portion. The LEDs are disposed on the lower jaw member. The light-shielding module has a main body and two resilient lateral shielding members disposed thereon. The lateral shielding members are disposed matchingly to the respective side portions of the lower jaw member. The guiding unit is connected to the upper or lower jaw member and extended out of the housing. The guiding unit allows the upper and lower jaw members to approach each other for clamping the optical fiber cable.

The optical signal inspection device of the instant disclosure has the following advantages. When the upper and lower jaw members approach each other, the lateral shielding members of the light-shielding module would form an intimate contact with respective side portions of the lower jaw member. Thus, interference due to ambient lighting upon the optical signal of the optical fiber cable can be prevented. The inspector can quickly diagnose the optical fiber cable. Also, the upper and lower jaw members can clamp the optical fiber cable of different sizes.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

Figure 1:
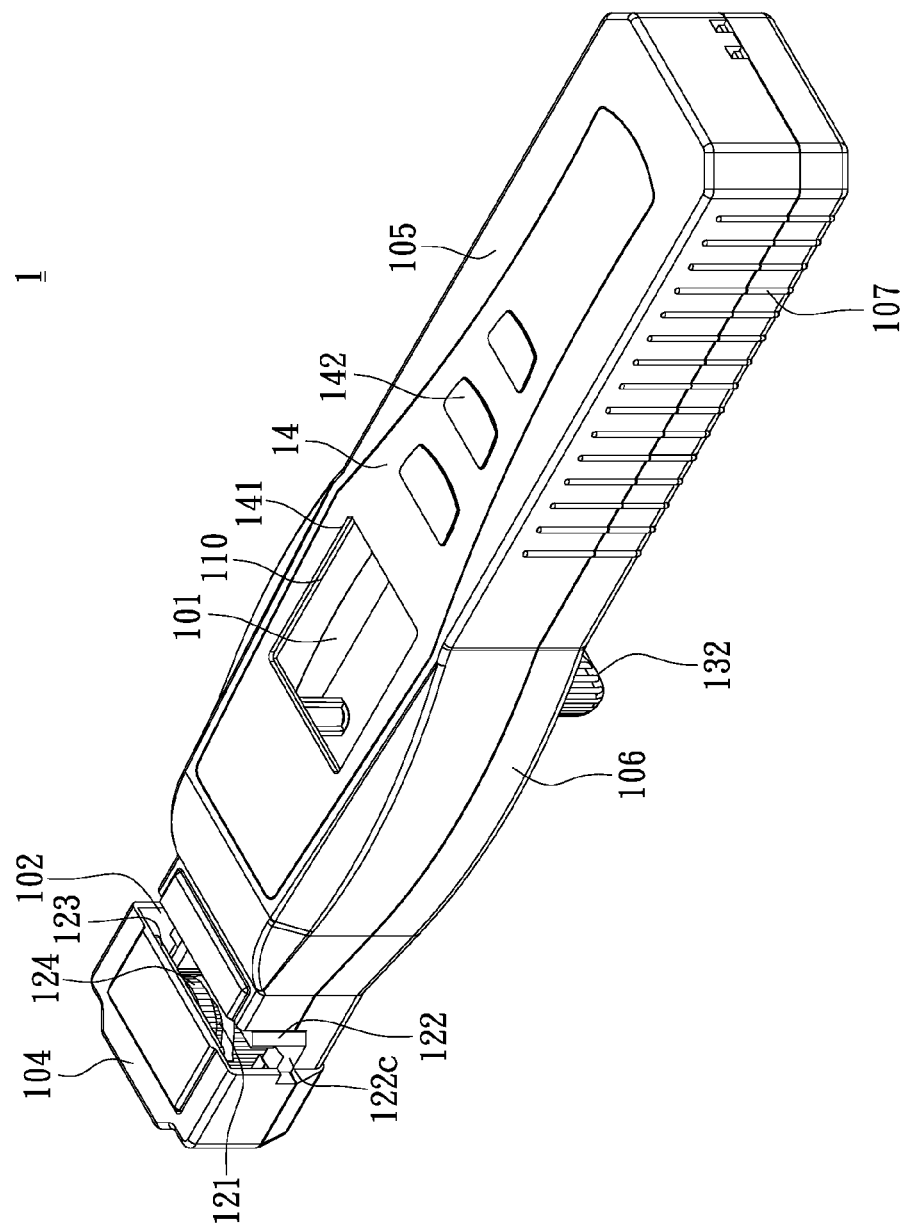
FIG. 1 is a perspective view of an optical signal inspection device of the instant disclosure.
Figure 2:
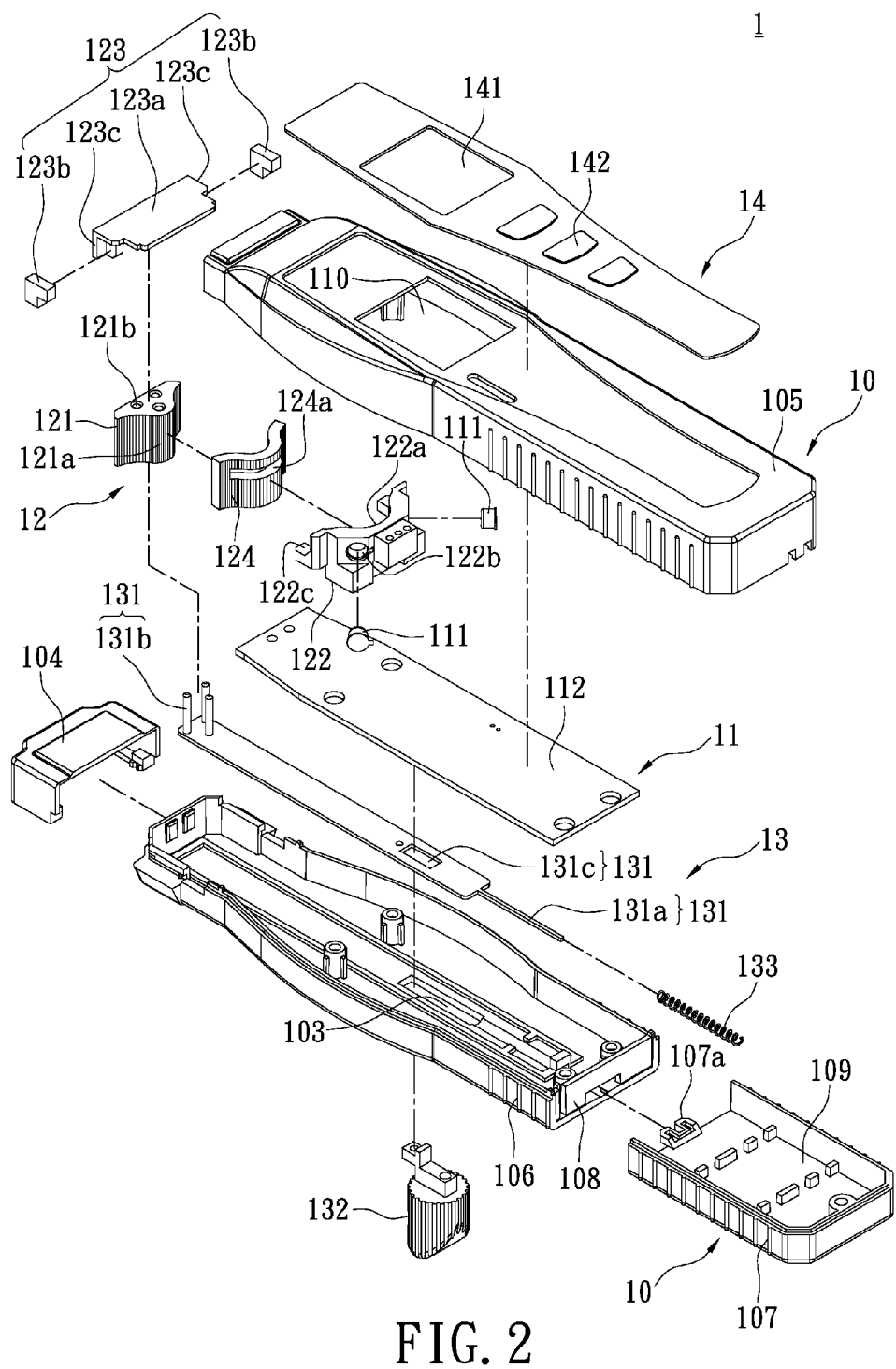
FIG. 2 is an exploded view of the optical signal inspection device of the instant disclosure.
Figure 3:
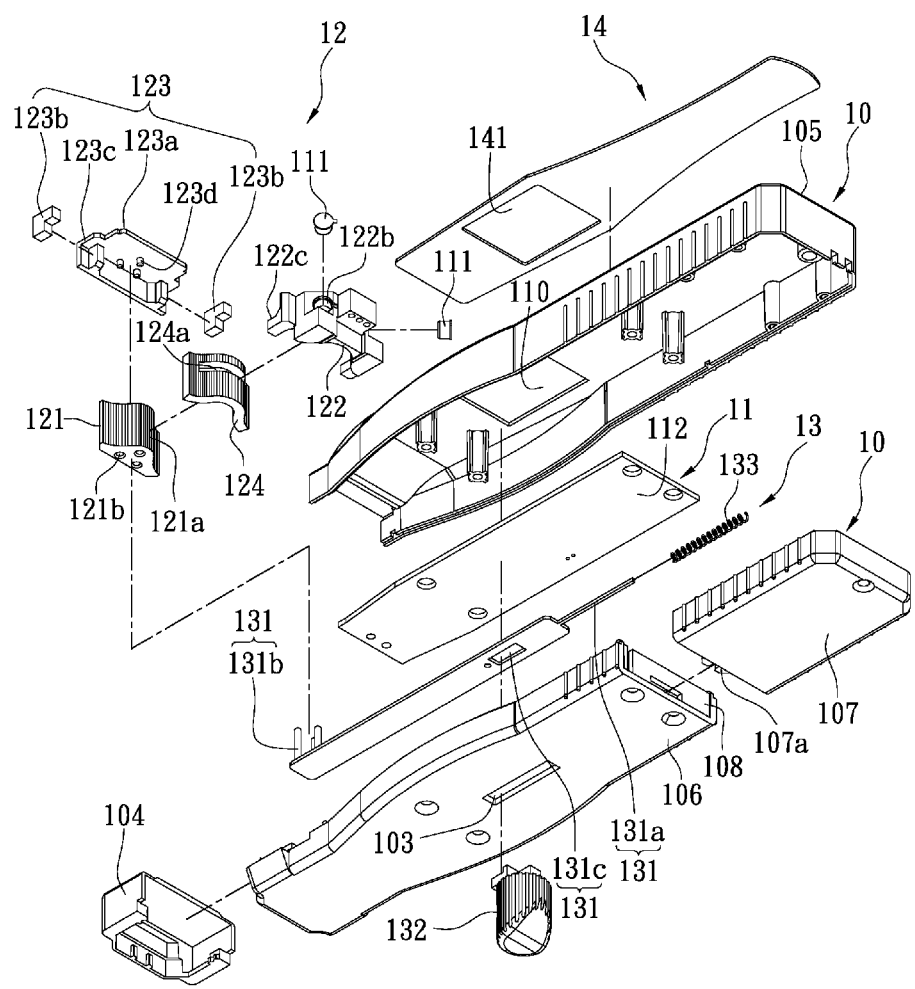
FIG. 3 is another exploded view of the optical signal inspection device of the instant disclosure.

Please refer to FIGS. 1~3. As shown in FIG. 2, the instant disclosure provides an optical signal inspection device 1, which comprises a housing 10, a diagnostic unit 11, a light-shielding module 123, an optical specimen holder 12 for a fiber cable 2 (FIG. 4A), and a guiding unit 13.

As shown in FIG. 1, a receiving space 101 is defined internally of the housing 10. The housing 10 also has a holding area 102 defined thereon for accommodating the fiber cable 2. As shown in FIG. 2, the diagnostic unit 11, the optical specimen holder 12, and the guiding unit 13 can all be stored in the receiving space 101. The diagnostic unit 11 includes a plurality of light-emitting diodes (LEDs) 111, such as PIN diodes (p-layer, intrinsic-layer, n-layer photodiode) or APDs (advanced photo diode), to test the fiber cable 2.

As shown in FIG. 2, the optical specimen holder 12 has an upper jaw member 121 and a lower jaw member 122 and is disposed across the holding area 102. A wave-like protrusion 121a is formed on the upper jaw member 121, and a complementary concaved portion 122a is formed on the lower jaw member 122. The upper and lower jaw members 121 and 122 are designed for clamping onto the fiber cable (not shown). The guiding unit 13 is connected to either the upper jaw member 121 or the lower jaw member 122. For the instant embodiment, the guiding unit 13 is connected to the upper jaw member 121. When the upper and lower jaw members 121 and 122 are pulled together by the guiding unit 13, the fiber cable is bent to conform to the curvature of the jaw members without being damaged. The bending of the optical fiber temporarily disrupts the total internal reflection of the light traveling in the core, so that the light is no longer confined in the core. The leaked light is picked up by the diagnostic unit 11 to identify the signal direction and determine the qualities of the fiber cable. For example, when the fiber cable is in use, the LEDs 111 can detect the optical signal and identify its traffic direction. If no signal is picked up by the LEDs, the fiber cable most likely has no service. In addition, the amount of light leakage depends on the magnitude of curvature of the fiber cable. Thus, based on the requirements, the protrusion 121a of the upper jaw member 121 can be shaped accordingly to meet the inspection requirements. The LEDs 111 are disposed preferably on the lower jaw member 122.

Notably, for the instant embodiment, the light-shielding module 123 has a main body 123a and two resilient lateral shielding members 123b disposed thereon. The main body 123a is assembled to the upper jaw member 121, and the opposing side portions of the lower jaw member 122 match with the lateral shielding members 123b. Thus, when the upper and lower jaw members 121 and 122 are approached to each other, the lateral shielding members 123b can abut matchingly with the side portions of the lower jaw member 122. These lateral shielding members 123b isolate the leaked light of the fiber cable 2 from being interfered by ambient lighting. Thereby, the inspection results can be more accurate and reliable. Since the lateral shielding members 123b are elastic, and the distance between the upper and lower jaw members 121 and 122 can be adjusted by the guiding unit 13, different sized fiber cables can be accommodated in the holding area 102 (FIG. 1) for testing.

Additional structural descriptions can be referred to in FIGS. 1~3. FIG. 1 shows a perspective view of the optical signal inspection device 1 of the instant disclosure, while FIGS. 2 and 3 are exploded views of the instant disclosure. In particular, the shape of the light-shielding module 123 and its mounting location on the upper jaw member 121 are not restricted. For the instant embodiment, as shown in FIG. 2, the light-shielding module 123 can be disposed on the top surface of the upper jaw member 121. Specifically, mounting portions 123c are formed on respective sides of the main body 123a to accommodate the lateral shielding members 123b. The material choice and mounting method of the lateral shielding members 123b are not restricted. For the instant embodiment, the mounting portions 123c are L-shaped slots formed underneath the top surface of the main body 123a. The lateral shielding members 123b can be firmly abutted to the upper jaw member 121 by the mounting portions 123c. The replaceable lateral shielding members 123b can be made of foam-like material and adhered to the mounting portions 123c.

A plurality of detection holes 122b can be formed on the lower jaw member 122 to accommodate the LEDs 111. The shape, quantity, and arrangement of the detection holes 122b are not restricted. For the instant embodiment, two detection holes 122b and two LEDs 111 are shown in the figures, with the detection openings 111 arrayed in a funnel-shaped pattern. The funnel-shaped pattern allows the LEDs 111 to follow the curvature of the bent fiber cable more closely for inspection. In corresponding to the lateral shielding members 123b, a pair of support portions 122c can be extended forwardly from the side portions of the lower jaw member 122. For the instant embodiment, as shown in FIG. 2, the support portions 122c can be approximately L-shaped and oriented at an angle of 90 degrees in the counter-clockwise direction. In corresponding to the mounting portions 123c, the lateral shielding members 123b can be L-shaped and oriented at an angle of 90 degrees in the clockwise direction. Thus, when the upper and lower jaw members 121 and 122 approach each other, the lateral shielding members 123b and the support portions 122c can sealingly complement each other. Thereby, the inspection device can be kept clear of any outside interference due to ambient lighting.

The guiding unit 13 includes a slider 131, a handle 132, and an elastic member 133. One end of the slider 131 can be connected to the upper jaw member 121 or the lower jaw member 122. For the instant embodiment, the slider 131 is connected to the upper jaw member 121. Namely, a plurality of projections 131b is formed on the slider 131, and a plurality of fixing holes 121b are formed correspondingly on the upper jaw member 121. By engaging the projections 131b with the fixing holes 121b, the slider 131 is connected securingly to the upper jaw member 121. Similarly, a plurality of protruding bumps 123d is formed on the inner surface of the main body 123a of the light-shielding module 123 for engaging with the fixing holes 12 1b. Next, an extension 131a is formed on the opposite end of the slider 131 and fitted with the elastic member 133. The elastic member 133 is longer than the extension 131a. A longitudinal slot 103 is formed on the housing 10. The handle 132 is connected to the slider 131 by passing through the slot 103 of the housing 10. In particular, a fixing hole 131c can be formed on the slider 131 for screwing the handle 132 onto the slider 131.

Next, the clamping operation of the inspection device is described herein. When the user pulls the handle 132 toward him/her and holds it in place, the slider 131 is moved accordingly in compressing the elastic member 133. Being connected to the slider 131, the upper jaw member 121 is displaced toward the lower jaw member 122 for clamping the fiber cable. Once the fiber cable has been inspected, the user can release the handle 132 and the upper jaw member 121 would return to its original position automatically. The self-return motion is accomplished by the restoring force of the elastic member 133 as it returns to its natural length when unloaded.

Furthermore, a wave-like intermediate piece 124 can be disposed between the upper jaw member 121 and the lower jaw member 122. The front portion of the intermediate piece 124 is matched to the protrusion 121a of the upper jaw member 121, while the back portion thereof is matched to the concaved portion 122a of the lower jaw member 122. The material choice and arrangement of the intermediate piece 124 are not restricted. For the instant embodiment, as shown in FIG. 2, the intermediate piece 124 can be a foam and pasted to the upper jaw member 121. Notably, a slit 124a is formed on the intermediate piece 124 parallel to the concaved portion 122a. The width of the slit 124a is less than the smallest available fiber cable. Therefore, when clamping onto the fiber cable, the intermediate piece 124 can act as a buffer between the upper jaw member 121 and the fiber cable. The buffering effect prevents the bent fiber cable from being damaged. Also, being smaller than the fiber cable, the slit 124a can prevent the fiber cable from slipping while being inspected. In other words, the intermediate piece 124 also assists in anchoring the fiber cable.

Please refer back to FIGS. 2 and 3. The optical signal inspection device 1 further includes a cover 104, an upper shell 105, a lower shell 106, a battery holder 107, and a divider 108. The battery holder 107 can be removably connected to the upper and lower shells 105 and 106. The divider 108 is bounded by the upper and lower shells 105 and 106. Together, a battery bay 109 is defined by the upper shell 105, the battery holder 107, and the divider 108. The battery (not shown) powers the optical signal inspection device 1. Meanwhile, the cover 104 is used to shield various parts of the optical specimen holder 12, such as the upper jaw member 121, the lower jaw member 122, the light-shielding module 123, the side blocks 123b, and the intermediate piece 124. The cover 104 also keeps the dust from entering the detection holes 122b. A stopper 107a can further be formed on the battery holder 107. When the upper jaw member 121 is pulled toward the lower jaw member 122, the extension 131a of the slider 131 would be abutted by the stopper 107a. The stopper 107a prevents the guiding unit 13 from being displaced excessively by the user.

In addition, the diagnostic unit 11 may further include a circuit board 112, a plurality of electrical elements (not shown), a display (not shown), etc. These electrical elements and display can be connected electrically to the circuit board 112. For the instant embodiment, as shown in FIG. 2, a plurality of first openings 110 can further be formed on the housing 10. A control panel 14 having a plurality of second openings 141 formed thereon can be disposed on the housing 10. A plurality of buttons 142 is disposed on the control panel 14 and can be connected electrically to the circuit board 112. The buttons 142 are exposed on the top surface of the control panel 14 near the second openings 141. When inspecting the fiber cable, the user can operate these buttons 142 of the control panel 14 to check the optical signal. After being processed by the circuit board 112, the diagnostic results can be viewed through the display.

For the instant embodiment, the lower jaw member 122 can be secured to the circuit board 112. The upper jaw member 121 can be displaced by the guiding unit 13 in moving toward the lower jaw member 122 for clamping onto the fiber cable.

Figure 4A:
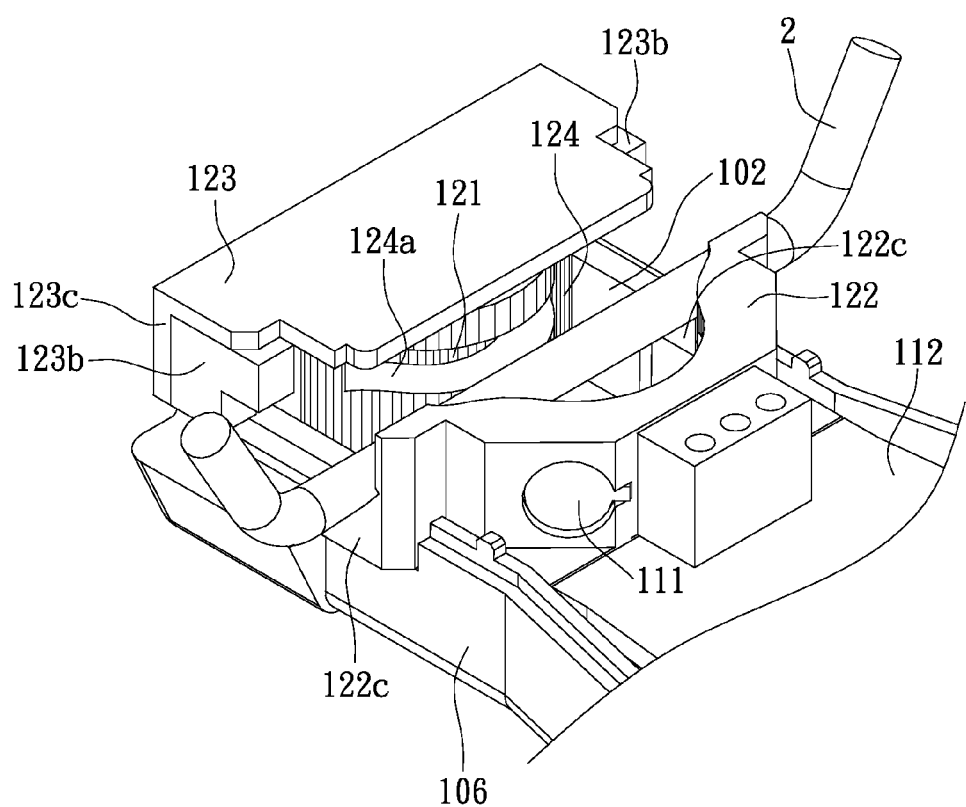
FIG. 4A is a schematic view of an optical specimen holder of the optical signal inspection device.
Figure 4B:
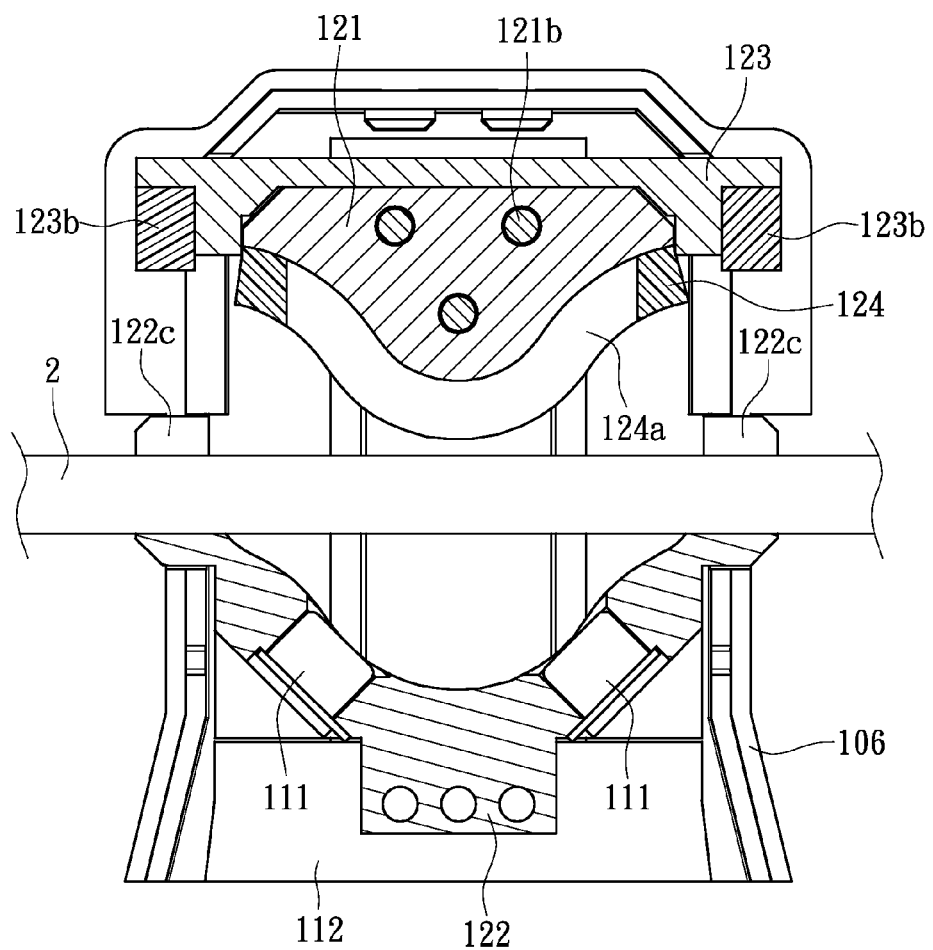
FIG. 4B is a sectional view of FIG. 4A.
Figure 5A:
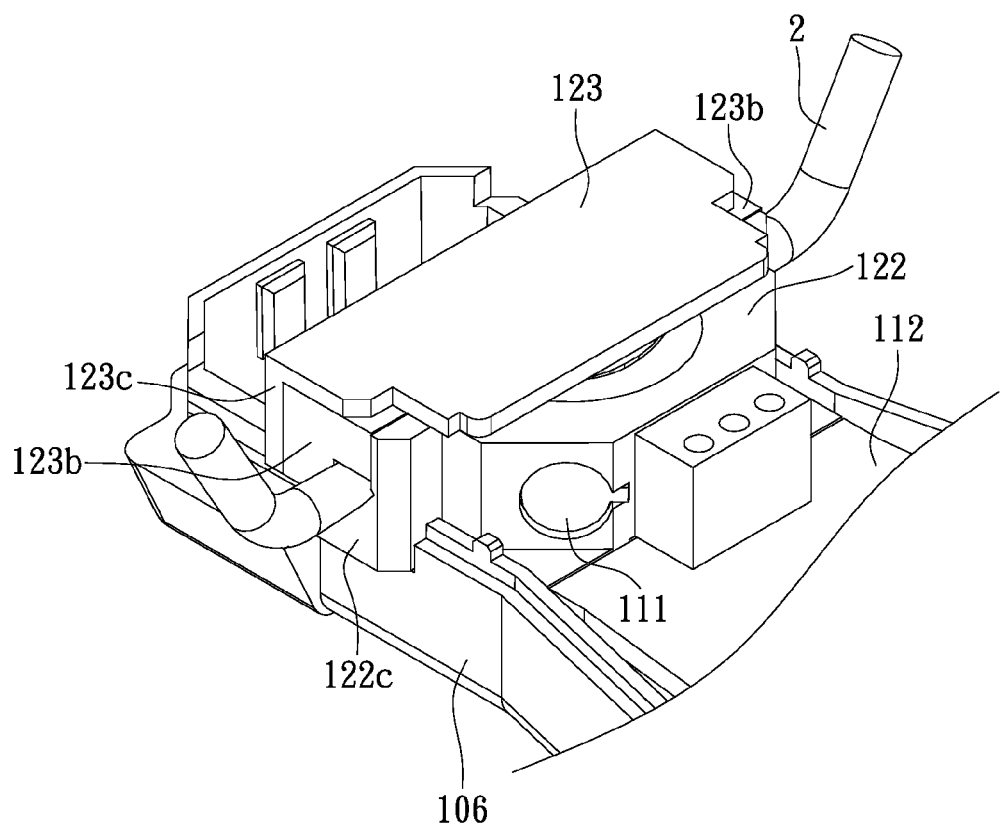
FIG. 5A is a schematic view showing the optical specimen holder in use.
Figure 5B:
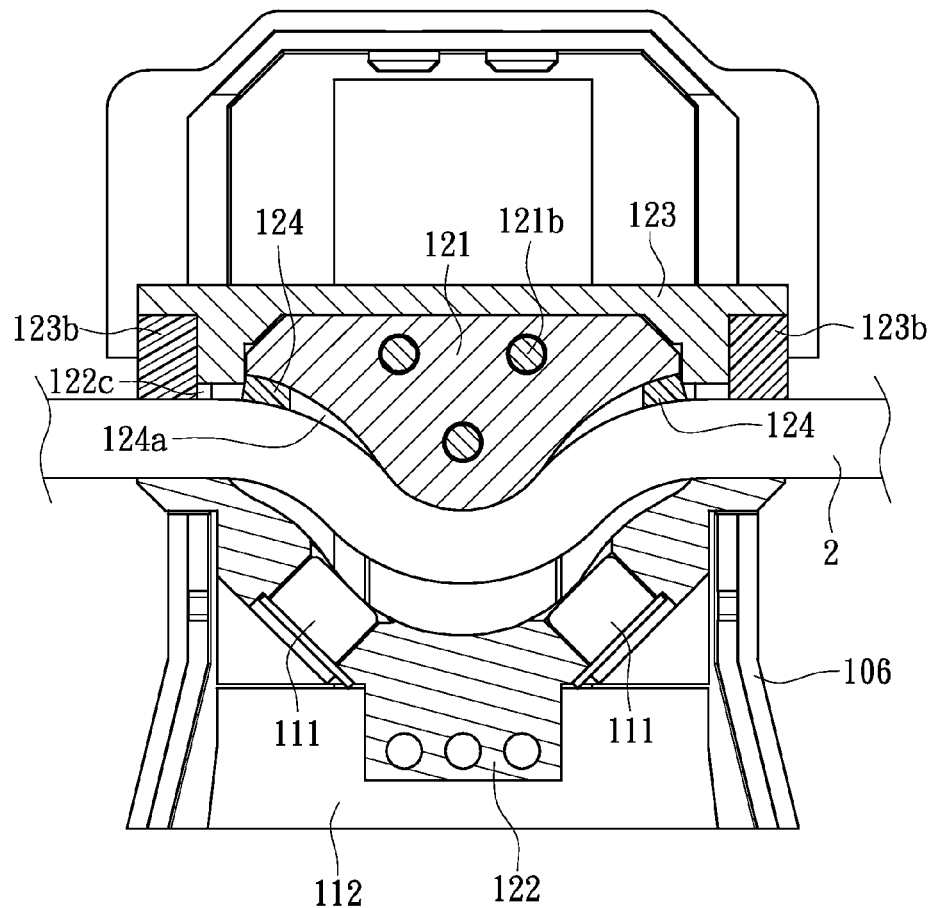
FIG. 5B is a sectional view of FIG. 5A.

In use, the operation of the optical signal inspection device 1 is illustrated in FIGS. 4A~5B. FIGS. 4A and 4B are schematic view and sectional view of the optical specimen holder 12, respectively, while FIGS. 5A and 5B are schematic view and sectional view of the optical specimen holder 12 in use, respectively. As shown in FIGS. 4A and 4B, when inspecting the fiber cable 2, the fiber cable 2 can first be rested onto the support portions 122c of the lower jaw member 122. Next, when the upper jaw member 121 is approaching the lower jaw member 122, the intermediate piece 125 would first abut the fiber cable 2. The fiber cable 2 would squeeze against the intermediate piece 125 and abut the first jaw member 121 by settling into the slit 124a. Shown in FIGS. 5A and 5B, as the upper jaw member 121 continues to approach and tightening the fiber cable 2, the fiber cable 2 is bent into a curvature without damaging the fiber. The lateral shielding members 123b and the support portions 122c of the lower jaw member 122 are kept in intimate contact over the fiber cable 2. In other words, the holding area 102 (FIG. 4A) is completely sealed by the light-shielding unit 123, the upper jaw member 121, the lower jaw member 122, the housing 10, the lateral shielding members 123b, and the support portions 122c, against penetration by ambient lighting. Free from external interference, the leaked light from the fiber cable 2 can be tested accurately by the LEDs 111 to improve inspection accuracy.

Also, as illustrated in FIG. 2, the user can operate the handle 132 to adjust the distance between the upper jaw member 121 and the lower jaw member 122. When displacing the guiding unit 13, the elastic member 133 is abutted and compressed by the stopper 107a of the battery holder 107. Once the inspection of the fiber cable 2 is completed, the user only needs to release the handle 132. When unloaded, the restoring force of the elastic member 133 would enable the upper jaw member 121 to return to its original position automatically for next inspection. Thereby, the optical signal inspection can be implemented efficiently.

Based on the above, the optical signal inspection device of the instant disclosure has the following advantages. Namely, interference due to ambient lighting can be prevented and light leakage from the fiber cable can be minimized. Next, the inspection device has a simple structure and can accommodate fiber cables of different sizes. Also, the inspection device would not cause any damage to the fiber core. Overall, the inspection device provides a safe and efficient means for inspecting and troubleshooting the fiber cables.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An optical signal inspection device, comprising:
   a housing having a receiving space defined therein and a fiber cable holding area defined thereon;
   a diagnostic unit having a plurality of light-emitting diodes (LEDs) disposed in the receiving space;
   an optical specimen holder disposed in the receiving space corresponding to the fiber cable holding area, the optical specimen holder having an upper jaw member and a lower jaw member configured to retain a fiber cable for diagnosis, wherein a curved protrusion is formed on the upper jaw member, wherein a complementary concaved portion is formed on the lower jaw member, and wherein the LEDs are disposed on the lower jaw member;
   a light shielding module having a main body and a pair of lateral shielding members arranged thereon disposed in the receiving space, wherein two side portions are formed on the lower jaw member in correspondence to the lateral shielding members; and
   a guiding unit disposed in the receiving space and extending out of the housing, the guiding unit being secured to one of the upper jaw member and the lower jaw member to enable manipulation of the closure of the jaw members toward each other for retaining the fiber cable.

2. The optical signal inspection device of claim 1, wherein a pair of mounting portions are formed on opposite sides of the main body for mounting the lateral shielding members.

3. The optical signal inspection device of claim 2, wherein a plurality of detection holes are formed on the lower jaw member for accommodating the LEDs, and wherein a pair of support portions are formed on opposite sides of the lower jaw member corresponding to the lateral shielding members.

4. The optical signal inspection device of claim 3, wherein the guiding unit further includes a slider, a handle, and an elastic member, wherein one end of the slider is secured to the upper jaw member or lower jaw member, wherein an extension is formed on opposite end thereof and fitted with the elastic member, and wherein a slot is formed on the housing for allowing the handle to pass through and connect to the slider.

5. The optical signal inspection device of claim 4, wherein a plurality of round projections are formed on the slider while the main body has a plurality of protruding bumps formed thereon, and wherein a plurality of fixing holes are formed on the upper jaw member for engaging with the round projections and the protruding bumps.

6. The optical signal inspection device of claim 1, wherein an intermediate piece is disposed between the upper jaw member and the lower jaw member, and wherein a slit is formed on the intermediate piece parallel to the concaved portion.

7. The optical signal inspection device of claim 1, wherein the housing further includes a cover, an upper shell, a lower shell, a battery holder, and a divider, wherein the battery holder can be removably connected to the upper and lower shells, wherein the divider is surrounded by the upper and lower shells, and wherein a battery bay is defined by the upper shell, the battery holder, and the divider.

8. The optical signal inspection device of claim 1, wherein the diagnostic unit further includes a circuit board connected electrically to the LEDs.

9. The optical signal inspection device of claim 8, wherein a plurality of first openings are formed on the housing.

10. The optical signal inspection device of claim 9, wherein a control panel is disposed on the housing, wherein a plurality of second openings are formed on the control panel, and wherein a plurality of buttons are disposed exposingly on the control panel and connected electrically to the circuit board.

* * * * *